Patented Oct. 17, 1933

1,931,381

UNITED STATES PATENT OFFICE 1,931,381

PRODUCTION OF TITANIUM DIOXIDE FROM TITANIUM TETRACHLORIDE

Hermann Haber, Elbblick, Aussig on the Elbe, and Paul Kubelka, Aussig on the Elbe, Czechoslovakia, assignors, by mesne assignments, to Krebs Pigment and Color Corporation, Newark, N. J., a corporation of Delaware No Drawing. Application September 3, 1931 Serial No. 561,027

3 Claims. (Cl. 23—202)

This invention relates to titanium dioxide and its production from titanium tetrachloride under the action of heat.

It is well known that the reaction of titanium tetrachloride vapor in mixture with water vapor results in the obtention of products which contain crystalline particles detectable under the microscope and these products are consequently not specially adapted for pigment purposes. Further this process executed in the ordinary way suffers from the disadvantage that it is difficult or practically impossible to provide apparatus which can resist the action of moist hydrochloric acid gases at high temperatures. For such reasons as the above the production of titanium dioxide by the reaction of titanium tetrachloride vapor with steam has hitherto not acquired technical significance.

The object of the invention is to obviate such disadvantages as those referred to and to provide improved processes enabling titanium dioxide in finely divided and soft condition and of notable whiteness suitable for use as pigments and the like to be obtained while using titanium tetrachloride as a starting material.

The invention consists in a process for the production of titanium dioxide from vaporized titanium tetrachloride according to which the splitting reaction is effected by means of oxygen or oxygen-bearing gases at temperatures above about 1000°.

The invention further consists in a process as set forth carried out in the presence of inert gas or gases.

The invention further consists in a process as set forth in either of the two preceding paragraphs according to which the reaction gases are introduced separately into a suitable reaction space heated to the required reaction temperature, one or more of the reaction gases preferably being preheated prior to their being brought together.

The invention further consists in the processes of titanium dioxide manufacture herein indicated.

The invention further consists in titanium dioxide when manufactured according to any of the four preceding paragraphs.

As a specific example of the method according to this invention the following is given:—

In a saturation vessel constructed and operating on the lines of a wash bottle which is charged with titanium tetrachloride and tempered to about 120°, a gas mixture is produced by the introduction of nitrogen which mixture consists of roughly 50% titanium tetrachloride vapor and 50 percent nitrogen. This gas mixture is passed into a reaction vessel, which is conveniently formed by an upright tube, heated by external means to 1100°, the vessel being constructed of or lined with material resistant to attack by chlorine. Separately from the mixture referred to, preheated air is introduced into the reaction vessel, and the proportions and quantities are so chosen that for each liter of reaction space there are introduced per minute 100 ccms. of the mixture of titanium tetrachloride and nitrogen (=500 ccm. titanium tetrachloride vapor) and 1000 ccms. air. The gases are passed through the reaction vessel in a downward direction, reacting to form titanium dioxide and chlorine and then passing into a dust chamber or other collecting means located under the reaction vessel, in which chamber or the like the titanium dioxide is deposited. The titanium dioxide obtained as above has excellent pigmentary properties, without requiring special subsequent treatment.

It is understood that the foregoing example is in no way limitative, and that modifications and additions may be introduced. In general however if the conditions of the example are not substantially departed from good non-crystalline products will be produced, which is remarkable in view of the fact that the heating of titanium dioxide hydrate separated from sulphuric acid solutions, to temperatures of under 1000° gives rise to coarsening of the particles and discoloration, unless special measures are taken; in fact, if the temperature be increased above 1000°, for instance to 1100°, discolorations and crystallizations of such titanium dioxide can no longer be avoided.

The risk of coarsening and unwanted crystallization of the particles occurring in the oxygen splitting of the present methods is reliably avoided if the reaction gas mixture is brought as directly as possible to the temperatures required for complete splitting of the titanium tetrachloride. This can be obtained by arranging for the gaseous mixture containing titanium tetrachloride vapor and oxygen to pass through the temperature interval below the splitting temperature at a high speed. It is however also advantageous not to mix the reaction gases, which are if desired preheated, until they enter the reaction space which is already heated to the splitting temperature, and thus reliably to avoid any risk of premature reaction and coarsening of the titanium dioxide particles occurring. The choice of the splitting temperature and gas velocity can be regulated within wide limits, provided the temperature is above 1000°. During the reaction inert gases may be present and, more especially when the reaction gases are introduced into the reaction space separately, the titanium terachloride can be introduced dispersed in a stream of inert gas. Air comes into consideration preferably as gas containing oxygen.

The process outlined above has the advantage over the known steam-splitting of titanium tetrachloride, that in place of the undesirable hydrochloric acid gas formed in that case, elementary chlorine is recovered which can advantageously be used again for the chlorination of titanium dioxide or ilmenite.

What is claimed is:

1. In a process for the production of titanium dioxide, the step which comprises heating vaporized tetrachloride in the presence of free oxygen-containing gases at temperatures in excess of approximately 1000° C.

2. In a process for the production of titanium dioxide, the step which comprises heating titanium tetrachloride in the presence of free oxygen-containing gases at temperatures in the order of 1100° C.

3. In a process for the production of titanium dioxide the step which comprises separately preheating titanium tetrachloride and free oxygen-containing gases to temperatures above 1000° C., and introducing said preheated materials into a reaction space heated to temperatures in excess of about 1000° C.

HERMANN HABER.
PAUL KUBELKA.